United States Patent
Lee

(10) Patent No.: US 9,851,208 B2
(45) Date of Patent: Dec. 26, 2017

(54) APPARATUS AND METHOD FOR PROVIDING GUIDANCE INFORMATION USING CROSSWALK RECOGNITION RESULT

(71) Applicant: Thinkware Corporation, Seongnam-si, Gyeonggi-do (KR)

(72) Inventor: Han Woo Lee, Seoul (KR)

(73) Assignee: Thinkware Corporation, Seongnam-si (KR)

( * ) Notice: Subject to any disclaimer, the term of this patent is extended or adjusted under 35 U.S.C. 154(b) by 0 days.

(21) Appl. No.: 15/157,364

(22) Filed: May 17, 2016

(65) Prior Publication Data

US 2016/0341558 A1    Nov. 24, 2016

(30) Foreign Application Priority Data

May 22, 2015    (KR) .................. 10-2015-0072119

(51) Int. Cl.
| | | |
|---|---|---|
| *G01C 21/30* | (2006.01) | |
| *G01S 19/13* | (2010.01) | |
| *G01S 19/14* | (2010.01) | |
| *G06K 9/00* | (2006.01) | |
| *G01S 19/48* | (2010.01) | |
| *G01C 21/36* | (2006.01) | |

(52) U.S. Cl.
CPC .............. *G01C 21/30* (2013.01); *G01S 19/13* (2013.01); *G01S 19/14* (2013.01); *G01S 19/48* (2013.01); *G06K 9/00798* (2013.01); *G06K 9/00805* (2013.01); *G01C 21/3647* (2013.01)

(58) Field of Classification Search
CPC .. G06K 9/00; G06K 9/00798; G06K 9/00805; G01C 21/00; G01C 21/26; G01C 21/30; G01C 21/34
See application file for complete search history.

(56) References Cited

U.S. PATENT DOCUMENTS

| | | | | |
|---|---|---|---|---|
| 2001/0012981 A1* | 8/2001 | Yamashita | ......... | G01C 21/3626 701/410 |
| 2009/0105936 A1* | 4/2009 | Shibasaki | ............ | G09B 29/106 701/532 |
| 2011/0130956 A1* | 6/2011 | Tracton | .............. | G01C 21/3644 701/533 |
| 2012/0065811 A1* | 3/2012 | Nakamura | .............. | G01C 21/30 701/1 |
| 2016/0305794 A1* | 10/2016 | Horita | ................ | G01C 21/3602 |
| 2017/0060234 A1* | 3/2017 | Sung | ...................... | B60R 1/006 |

\* cited by examiner

*Primary Examiner* — Yonel Beaulieu
(74) *Attorney, Agent, or Firm* — Fenwick & West LLP

(57) ABSTRACT

An apparatus of providing guidance information provides guidance information about the result of recognizing a crosswalk around a vehicle as information for inducing safe driving. The guidance information about a crosswalk is differently provided in accordance with a surrounding situation concerned with forward traveling of the vehicle.

18 Claims, 13 Drawing Sheets

FIG. 3
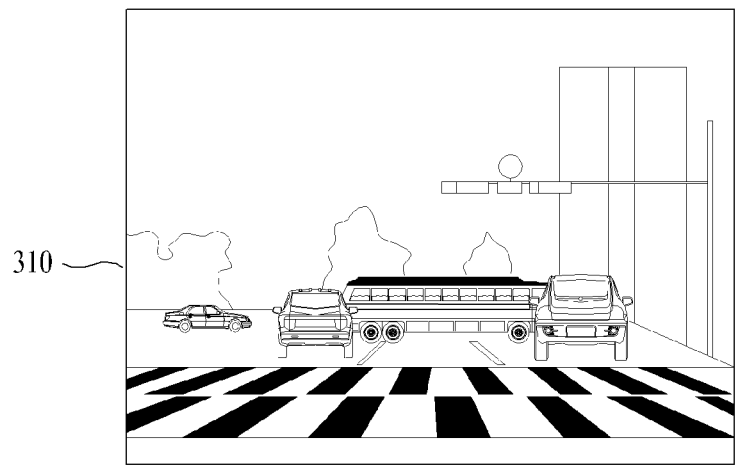
First image (color)
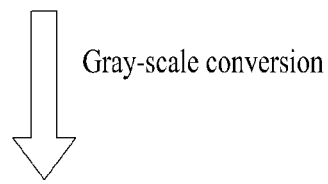
Gray-scale conversion
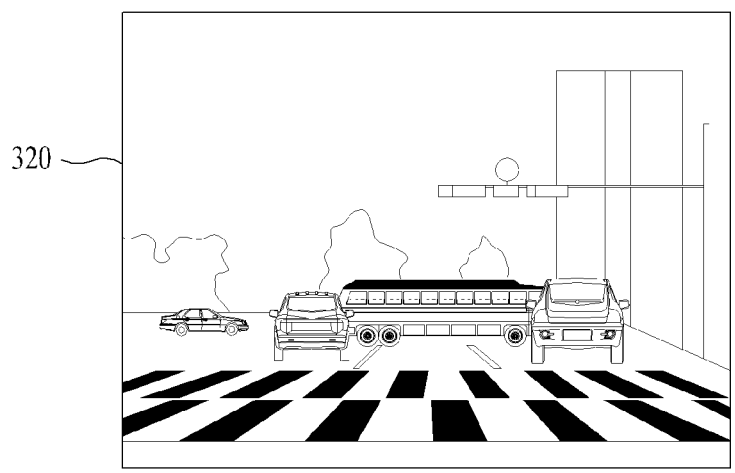
Second image (gray-scale)

Detection region improved image

APPARATUS AND METHOD FOR PROVIDING GUIDANCE INFORMATION USING CROSSWALK RECOGNITION RESULT

CROSS-REFERENCE TO RELATED APPLICATIONS

A claim for priority under 35 U.S.C. §119 is made to Korean Patent Application No. 10-2015-0072119 filed May 22, 2015, in the Korean Intellectual Property Office, the entire contents of which are hereby incorporated by reference.

BACKGROUND

Embodiments of the inventive concept described herein relate to a technique of announcing information about a situation around a vehicle to safely drive the vehicle.

One of the most important things when a vehicle is driven is stability including traffic accident prevention. For the purpose of stability, various auxiliary devices for controlling the attitude of a vehicle or functions of vehicle component devices are installed in a vehicle, and safety devices such as a safety belt, an airbag and the like are installed in a vehicle. In addition, when a car video recorder is installed in a vehicle, the data transmitted from various kinds of sensors may be stored in the car video recorder. When a vehicle accident occurs, the car video recorder may be retrieved from the vehicle, and the cause of the accident may be established by analyzing the stored data in the car video recorder.

A driver needs to rapidly perceive a person and an object located forward during driving for the safety driving. An electronic appliance such as a car video recorder installed in a vehicle may continuously photograph the surround of the vehicle. The electronic appliance may continuously monitor the surrounding of a vehicle in an image by using a computer vision algorithm. In case of detecting a specific situation, the driver may be informed of the detected situation.

As one example of an apparatus for analyzing an image photographed from a vehicle, a mobile apparatus for clamping down on an illegal vehicle is disclosed in Korean Publication No. 10-2007-0082980 (Published on Aug. 23, 2007), where an object (that is, a license plate number) in an image is recognized by analyzing the image collected through a camera installed in a vehicle.

SUMMARY

Embodiments of the inventive concept provide an apparatus and a method of providing guidance information for inducing a vehicle to safely travel, based on a crosswalk recognition result.

Embodiments of the inventive concept provide an apparatus and a method of amending a map matching position of a vehicle based on a crosswalk recognition result.

Embodiments of the inventive concept provide an apparatus and a method of distinguishing guidance information based on a result of recognizing a pedestrian on a crosswalk, a forward vehicle or a signaling state of a traffic light to provide the guidance information.

One aspect of embodiments of the inventive concept is directed to provide a method of providing guidance information which is implemented by a computer. The method includes: confirming a result of recognizing a crosswalk around a vehicle; comparing the crosswalk recognition result with map data on a GPS reception position of the vehicle; and amending a map matching position of the GPS reception position based on the comparison result.

Another aspect of embodiments of the inventive concept is directed to provide a method of providing guidance information which is implemented by a computer. The method includes: confirming a result of recognizing a crosswalk around a vehicle; confirming a result of recognizing a surrounding situation concerned with forward traveling of the vehicle; and distinguishing guidance information about the crosswalk recognition result based on the surrounding situation recognition result to provide the guidance information.

Still another aspect of embodiments of the inventive concept is directed to provide a method of providing guidance information which is implemented by a computer. The method includes: confirming a result of recognizing a crosswalk around a vehicle; confirming a result of recognizing a surrounding situation concerned with forward traveling of the vehicle; and distinguishing guidance information about the surrounding situation recognition result based on the crosswalk recognition result to provide the guidance information.

Still another aspect of embodiments of the inventive concept is directed to provide an apparatus for providing guidance information, which includes: a memory in which at least one program; and at least one processor, wherein, in accordance with the program, the at least one processor performs: confirming a result of recognizing a crosswalk around a vehicle; comparing the crosswalk recognition result with map data on a GPS reception position of the vehicle; and amending a map matching position of the GPS reception position based on the comparison result.

Still another aspect of embodiments of the inventive concept is directed to provide an apparatus for providing guidance information, which includes: a memory in which at least one program; and at least one processor, wherein, in accordance with the program, the at least one processor performs: confirming a result of recognizing a crosswalk around a vehicle; confirming a result of recognizing a surrounding situation concerned with forward traveling of the vehicle; and distinguishing guidance information about the crosswalk recognition result based on the surrounding situation recognition result to provide the guidance information.

Still another aspect of embodiments of the inventive concept is directed to provide an apparatus for providing guidance information, which includes: a memory in which at least one program; and at least one processor, wherein, in accordance with the program, the at least one processor performs: confirming a result of recognizing a crosswalk around a vehicle; confirming a result of recognizing a surrounding situation concerned with forward traveling of the vehicle; and distinguishing guidance information about the surrounding situation recognition result based on the crosswalk recognition result to provide the guidance information.

According to the embodiments, after a forward crosswalk is recognized, the crosswalk recognition result may be audio visually output to arouse recognition and attention to the crosswalk, such that a driver is induced to safely drive a vehicle.

BRIEF DESCRIPTION OF THE FIGURES

The above and other objects and features will become apparent from the following description with reference to the following figures, wherein like reference numerals refer to like parts throughout the various figures unless otherwise specified, and wherein

FIGS. 2 to 7 are views illustrating a method of recognizing a crosswalk according to an embodiment;

DETAILED DESCRIPTION

Hereinafter, embodiments will be described in detail with reference to accompanying drawings.

Embodiments of the inventive concept relate to an apparatus and a method of providing guidance information, in which a crosswalk in an image is recognized by using a camera image and the crosswalk recognition result, is utilized to provide the guidance information in a driving guidance environment.

The apparatus and method for providing guidance information according to an embodiment may be applied to a navigation system such as a navigation system supporting an augmented reality mode. The embodiments may be also implemented as an application for a mobile terminal such as a smart phone, a tablet, a wearable computer and the like.

Figure 1:
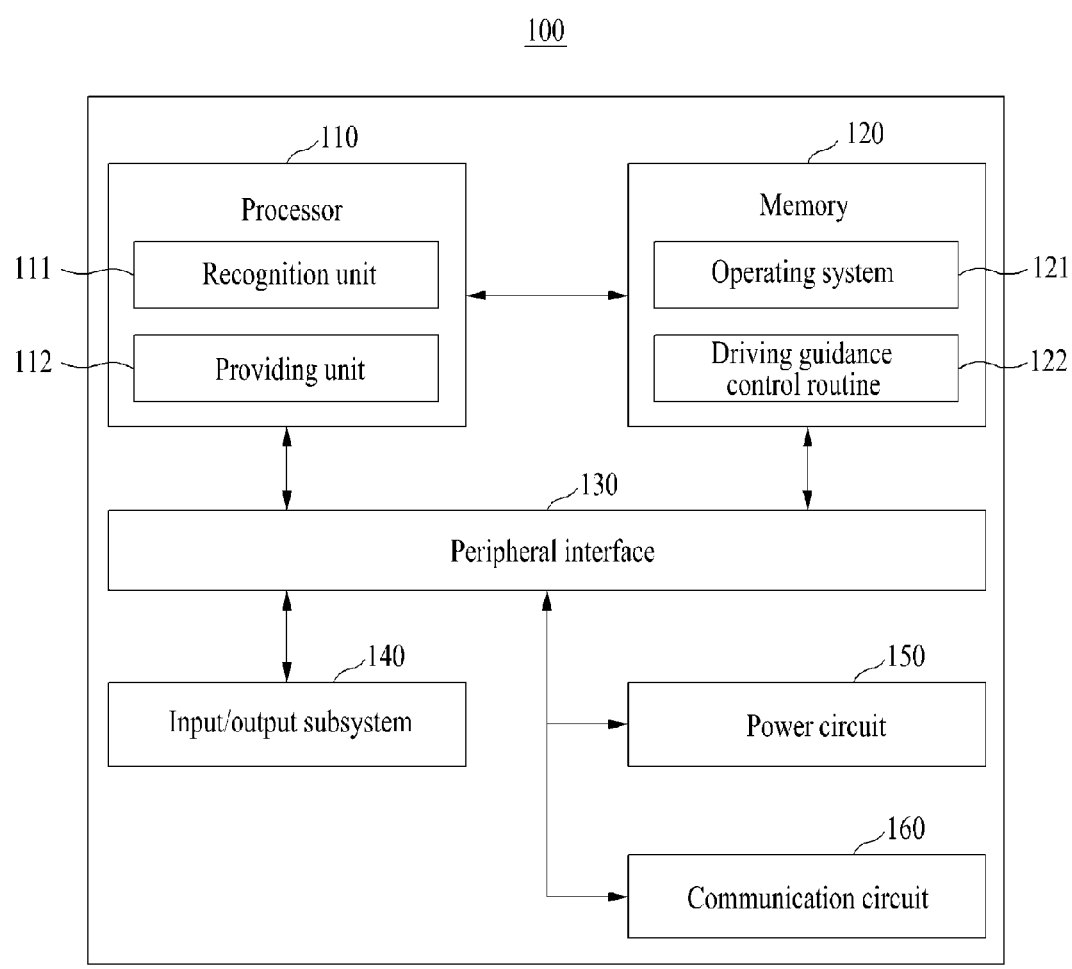
FIG. 1 is a block diagram illustrating one example of an internal configuration of an apparatus for providing guidance information according to an embodiment.

FIG. 1 is a block diagram illustrating one example of an internal configuration of an apparatus for providing guidance information according to an embodiment.

As shown in FIG. 1, the apparatus 100 for providing guidance information, which is a computer system, may include at least one processor 110, a memory 120, a peripheral interface 130, an input/output (I/O) subsystem 140, a power circuit 150, and a communication circuit 160.

Arrows of FIG. 1 represent communication and data transmission between elements of the computer system, which may be implemented by using a high-speed serial bus, a parallel bus, an SAN (Storage Area Network), and/or another suitable communication technique.

The memory 120 may include an operating system 121 and a driving guidance control routine 122. For example, the memory 120 may include a high-speed random access memory (RAM), a magnetic disc, a static RAM, a dynamic RAM, a read only memory (ROM), a flash memory, or a nonvolatile memory. The memory 120 may include program codes for the operating system 121 and the driving guidance control routine 122. In other words, the memory may include a software module, a command set, or a variety of data necessary for an operation of the computer system. In this case, the processor 110 may control an access to the memory 120 from the processor 110 or another component such as the peripheral interface 130.

The peripheral interface 130 may couple a peripheral input and/or output device of the apparatus 100 for providing guidance information to the processor 110 and the memory 120. The I/O subsystem 140 may couple various peripheral I/O devices to the peripheral interface 130. For example, the I/O subsystem 140 may include a controller for coupling a monitor, a keyboard, a mouse, a printer, or a peripheral device such as a touch screen, a camera or a sensor to the peripheral interface 130. According to another aspect, peripheral I/O devices may be coupled to the peripheral interface 130 without passing through the I/O subsystem 140.

All or a part of components of a terminal may be powered by the power circuit 150. For example, the power circuit 150 may include a power management system, at least one power source such as a battery or alternating current (AC), a charging system, a power failure detection circuit, a power converter or inverter, a power status indicator, or any other components for power generation, management, and distribution.

The communication circuit 160 may communicate with another computer system by using at least one external port. As described above, if necessary, the communication circuit 160 may include a radio frequency RF circuit and may communicate with another computer system by transmitting and receiving a RF signal known as an electromagnetic signal.

The processor 110 may execute a software module or a command set stored in the memory 120 to perform a variety of functions for the apparatus 100 for providing guidance information and to process data. In other words, the processor 110 may be configured to process an instruction of a computer program by performing basic arithmetic, logic and an input/output operation of the computer system. The processor 110 may be configured to execute program codes for a recognition unit 111 and a providing unit 112. The program codes may be stored in a recording device such as the memory 120.

The recognition unit 111 and the providing unit 112 may be configured to perform the method of providing guidance information which will be described below.

The apparatus 100 for providing guidance information illustrated in FIG. 1 may be exemplary. The apparatus 100 for providing guidance information may not include some of components shown in FIG. 1, may further include an additional component not shown in FIG. 1, or may be configured or disposed such that two or more components are coupled to each other. For example, the computer system for a communication terminal in a mobile environment may further include a touch screen, a sensor, and the like as well as components shown in FIG. 1, and the communication circuit 160 may include circuits for RF communication in various communication schemes such as Wi-Fi, 3G, LTE, Bluetooth, near field communication (NFC), Zigbee, and the like. Components capable of being included in the apparatus 100 for providing guidance information may be implemented with hardware including an integrated circuit specialized for at least one signal processing or application, software, or a combination thereof.

The apparatus 100 for providing guidance information configured above may receive an image (hereinafter, referred to as a 'camera image') from a camera (not shown) and may recognize a crosswalk in the camera image. In addition, the apparatus 100 for providing guidance information may provide various guidance information based on the crosswalk recognition result in a driving guidance environment for inducing a vehicle to be safely driven.

For example, the camera, which provides an image photographed forward of the vehicle, may be integrated with a vehicle navigation system to which the apparatus 100 for providing guidance information is applied. That is, the camera may be installed in a back of a navigation main body, at which a front glass of the vehicle is seen. As another example, a camera photographing forward of the vehicle, which is installed in another system capable of interworking with the apparatus 100 for providing guidance information or separately installed in an outside, may be utilized.

Specifically, to provide the guidance information used to induce the safe driving, following techniques may be applied to embodiments: (1) Technique of recognizing a crosswalk; (2) Technique of recognizing pedestrians on a crosswalk; (3) Technique of recognizing a forward vehicle; and (4) Technique of recognizing a traffic signal of a traffic light.

First, the technique of recognizing a crosswalk will be described.

Figure 2:
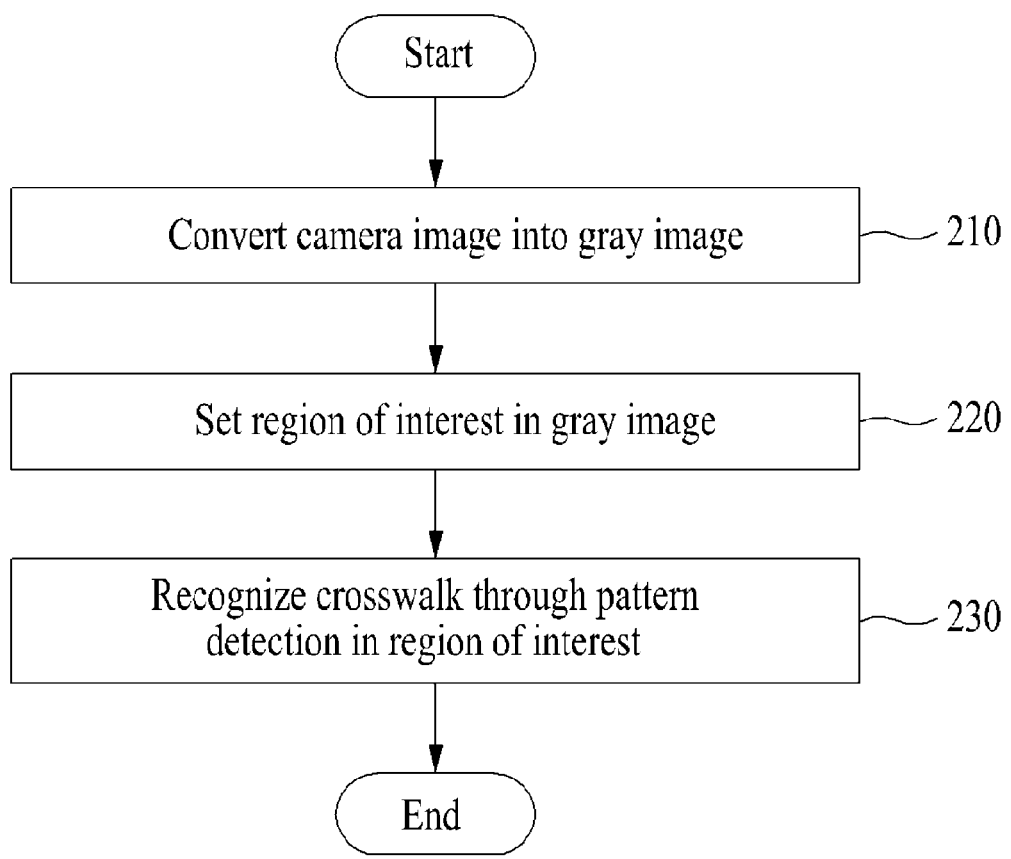

FIG. 2 is a flowchart illustrating a method of recognizing a crosswalk according to an embodiment. According to the method of recognizing a crosswalk of an embodiment, the following steps may be performed through the recognition unit 111 described with reference to FIG. 1.

In step 210, the recognition unit 111 may convert a camera image input from the camera into a grayscale (black and white) image. The camera image may be a color image, such as a RGB (Red, Green and Blue) image, having a size (for example, 640*480).

Referring to FIG. 3, a first image 310 may be a color image photographed by the camera, and a second image 320 may be a grayscale image into which the recognition unit 111 converts the color image.

Each pixel of a color image may have a color value representing the color of a pixel. The color value may include red, green and blue values. That is, the color image may be a RGB color image. Each pixel of a black-and-white image may have a color value representing the intensity of a pixel. The color value may have a value of 0 to 'n' (where n is an integer). For example, when a specific pixel is black, the color value of the specific pixel may be 0 (zero). In addition, when a specific pixel is white, the color value of the specific pixel may be n.

As described above, the recognition unit 111 may convert the camera image into a grayscale image through grayscale conversion. In addition, the recognition unit 111 may rectify the intensity values of the gray image such that the grayscale image has a constant intensity value distribution.

Since a forward vehicle or a distance from the forward vehicle may be erroneously recognized when a shadow exerts an influence on a part of a road, according to an embodiment, a method of amending a light source may be applied to minimize the influence of a shadow. For example, after a light source used for photographing of the camera is amended, the camera may photograph forward of the vehicle using the amended light source such that a RGB image is obtained. Alternatively, after applying a light source amendment algorithm to the RGB image to amend the light source of the RGB image, the recognition unit 111 may convert the amended RGB image into a grayscale image. Meanwhile, due to the influence of the subject reflected upon an inner glass of the vehicle, a crosswalk at a specific part of the image may not be recognized. To solve the problem and minimize the influence of reflection, an anti-reflection box may be attached to the front end of a camera lens to obtain an amended image.

Referring to FIG. 2 again, in step 220, the recognition unit 111 may set an ROI (Region of Interest) for detecting a crosswalk in the gray image. A part of the camera image may represent another region such as the sky, the horizon or a building as well as a road at which a crosswalk is located. When crosswalks are tried to be detected in all regions of the image, since the possibility of erroneously detecting an object, which is not a crosswalk, as a crosswalk may be increased, there is a need to set a part of the image as a part for detecting a crosswalk.

Figure 4:
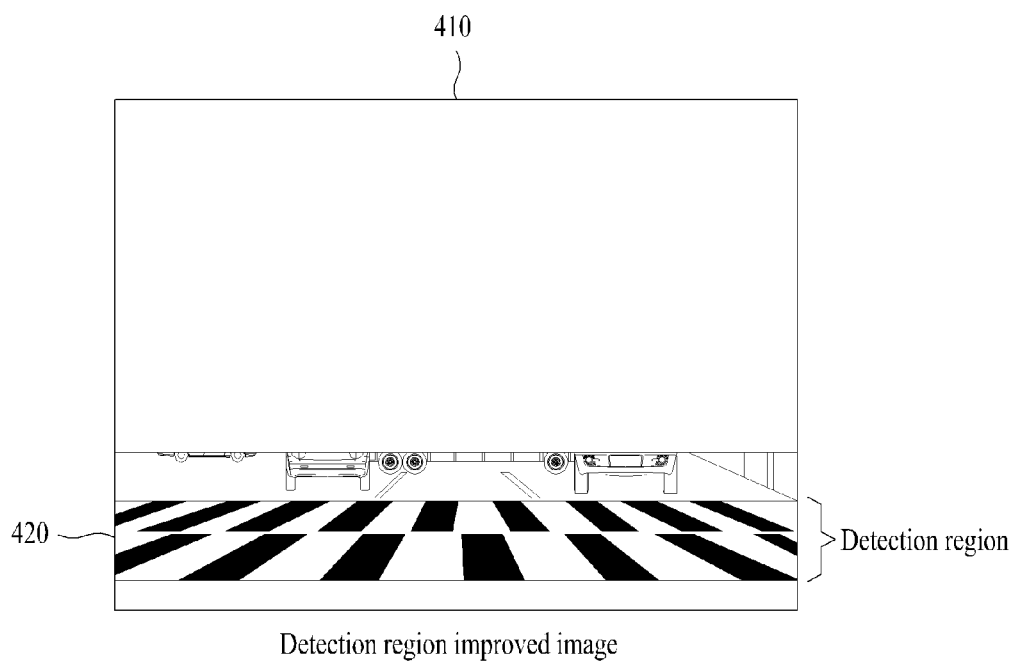

For example, the recognition unit 111 may set a ROI determined by a specific condition in the gray image. The specific condition may include a camera installing angle, a viewing angle, an image resolution, etc. That is, the recognition unit 111 may set a part of an image as the ROI and the image or a part of the image may be improved. FIG. 4 shows a ROI 420 in a ROI improved image 410. When the ROI 420 is set, the recognition unit 111 may determine the ROI 420 as a detection region for detecting a crosswalk.

As another example, after a line is detected in a gray image, the ROI may be set based on the lane. For example, after an edge is detected in an image by using the Canny algorithm to generate an edge image, a Hough transformation algorithm may be applied to the edge image to detect an edge represented as a straight line in the edge image such that a region corresponding to a position of the straight line is recognized as a line. In this case, the recognition unit 111 may detect at least one straight line candidates included in the edge image through Hough transformation, and one among the straight line candidates, which has the minimum distance from the center of the image, may be recognized as a line. In addition, the recognition unit 111 may determine one among the straight line candidates, which has a constant line width with respect to the traveling direction of the vehicle, as a lane. In general, a line exists on a road and has a constant width. When seen from the viewpoint of a driver, the lane appears not on the horizontal line but a line corresponding to the travelling direction of a vehicle. Thus, the recognition unit 111 may recognize one among the plurality of straight line candidates corresponding to the travelling direction of a vehicle, which has a constant width, as a lane. In addition, the recognition unit 111 may recognize ones among the straight line candidates, which are symmetrical to each other about the vertical central line of an image, as a line. The recognition unit 111 may set the ROI based on the lane detected in the image. For example, the recognition unit 111 may set, as a ROI, a region from a starting point of the lane in the image to a point spaced apart from the starting point by a predetermined distance in a y-axis direction. In this case, the line starting point and the predetermined distance, which are included in a condition for determining the ROI, may be estimated based on the line width and the viewing angle of the camera.

A crosswalk may be shaded due to shadows or the paint denoting a crosswalk may be worn out. When a small object such as a sticker or a paper is placed on a crosswalk, a shape of the crosswalk may be hidden. In addition, noise may exist in the photographed image of a crosswalk. In consideration of the problems, the recognition unit 111 may remove the noise in a ROI and may apply a closed image using a rectangular-shaped element to the ROI to normalize a damaged formed of a crosswalk. The reason of using a rectangular-shaped image is because a crosswalk generally has a sequence of black or white rectangular shapes. Due to the closed image, the region representing a crosswalk may be more defined.

Referring to FIG. 2 again, in step 230, the recognition unit 111 may detect a crosswalk in the ROI by image-analyzing the ROI. For example, the recognition unit 111 may binarize the ROI to a binary image by applying a mini-max filter to a horizontal line. Thus, the recognition unit 111 may detect a pattern representing a crosswalk in the binary image such that the crosswalk is detected in the ROI.

Figure 5:
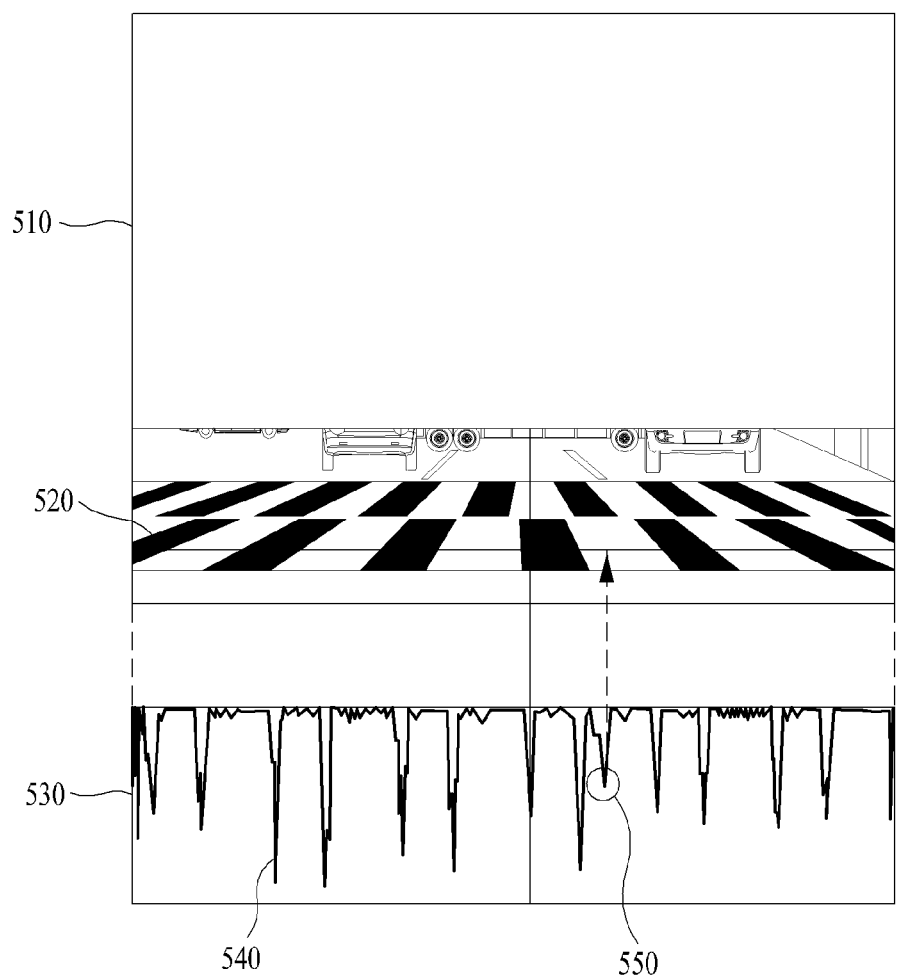

For example, FIG. 5 shows an image 510 and a horizontal line 520 in the image 510. A graph 530 illustrating a variation of a color value of the horizontal line is depicted below the image 510 in FIG. 5. A variation line 540 represents the variation of a color value of each pixel in the horizontal line. When the color values of continuative pixels are relatively constant (for example, all color values are approximate to white or black), a part of the variation line 540 corresponding to the continuative pixels may have high values. To the contrary, when the color values of continuative pixels are relatively and rapidly changed (for example, the color is changed from black to white or from white to black), a part of the variation line 540 corresponding to the continuative pixels may have low values. Thus, as the shorter a section of the variation line 540 is, in which the color value moves from a high value to a low value and then, from a low value to a high value, it may be considered that the horizontal line is clearly distinguished as a black or white line. However, when a real crosswalk is not clearly distinguished as white or black, or noise exists in the photographed image, the horizontal line may not be clearly distinguished as black or white. For example, when noise exists in a part of the region representing a crosswalk in an image, the noise is shown as an abnormal point 550 in the variation line 540. The noise may be represented as not black or white but gray which is a middle level of them. The color may be obviously unchanged based on a specific boundary. Therefore, the value of a part around the abnormal point 550 on the variation line 540 may be relatively changed and may have a value corresponding to a middle level. Thus, the recognition unit 111 may obtain better results when binarizing the color values after applying a specific filter to each color value of the pixels than those when the color value of the pixels on the horizontal line are directly binarized.

Figure 6:
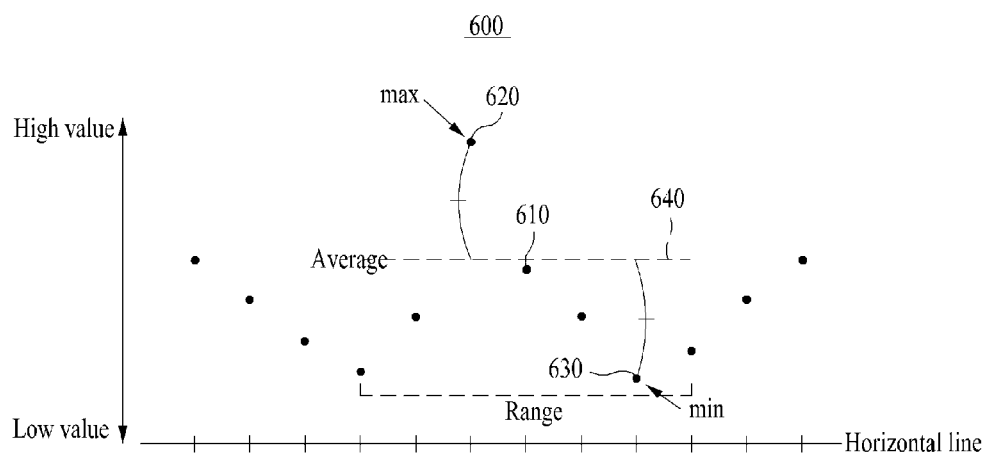

FIG. 6 is a graph illustrating the application of the mini-max filter, where the horizontal axis of the graph 600 represents pixels on a horizontal line. That is, specific coordinates on the horizontal axis represent a specific pixel on the horizontal line. The vertical axis of the graph 600 represents a color value of a pixel. In this instance, the color value may be a gray scale value. For example, a high value may represent a color approximate to white and a low value may represent a color approximate to black.

The recognition unit 111 may binarize the pixels on a horizontal line of an image, respectively by applying the mini-max filter to the pixels. In this case, the binarization of a pixel may represent that a color value of the pixel becomes the first or second binary value. One of "0" (or true) and "1" (or false) may be the first binary value and the other may be the second binary value. The binarization of a horizontal line may represent that all pixels on the horizontal line are binarized, respectively. The recognition unit 111 may binarize the pixels on a horizontal line, respectively and may binarize the horizontal lines in an image (or a set region), respectively so that the image is binarized.

The recognition unit 111 may set the minimum value among the color values of pixels within a constant range based on a specific pixel 610 as the minimum value of the mini-max filter for the specific pixel 610. In addition, the recognition unit 111 may set the maximum value among the color values of pixels within the constant range based on the specific pixel 610 as the maximum value of the minimax filter for the specific pixel 610. That is, the minimum value of the minimax filter for the specific pixel 610 may be the minimum value of the color values of the pixels within the constant range based on the specific pixel 610, and the maximum value of the minimax filter for the specific pixel 610 may be the maximum value of the color values of the pixels.

FIG. 6 shows the pixel 620 having the maximum color value and the pixel 630 having the minimum color value among the pixels in the constant range based on the specific pixel 610. In FIG. 6, the average of the color value of the pixel 640 and the color value of the pixel 610 is depicted as a horizontal line. As shown in FIG. 6, the constant range includes the specific pixel, three pixels positioned left of the specific pixel 610, and three pixels positioned right of the specific pixel 610. The constant range is exemplary. The specific pixel 610 is positioned at the center, the leftmost end, or the rightmost end in the constant range. The length of the constant range may be a constant or variable value. For example, the length of the constant range may be 1/n of the whole length of the horizontal line, where n is a real number of 1 or more. In addition, the constant range may represent m pixels, where m is a natural number of 1 or more. A suitable value of n or m may be determined through a test. For example, the recognition unit 111 may determine the value of n or m in accordance of the sizes of the white and black regions which alternate in a real crosswalk in the image. The mini-max filter may compare the color value of the specific pixel 610 with the average of the maximum and minimum values for the specific pixel 610. The mini-max filter may determine the binary value of the color value of the specific pixel 610 as the first or second binary value in accordance to the comparison result. For example, when the color value of the specific pixel 610 is equal to or more than the average value, the recognition unit 111 may determine the binary value of the color value of the specific pixel 610 as the second binary value. When the color value of the specific pixel 610 is less than the average value, the recognition unit 111 may determine the binary value of the color value of the specific pixel 610 as the first binary value. Alternatively, the recognition unit may compare the first brightness represented by the color value of the specific pixel 610 with the second brightness represented by the average value. When the first brightness is equal to or more than the second brightness, the recognition unit 111 may set the binary value of the color value of the specific pixel 610 as a binary value representing white. When the first brightness is less than the second brightness, the recognition unit 111 may set the binary value of the color value of the specific pixel 610 as a binary value representing black.

Figure 7:
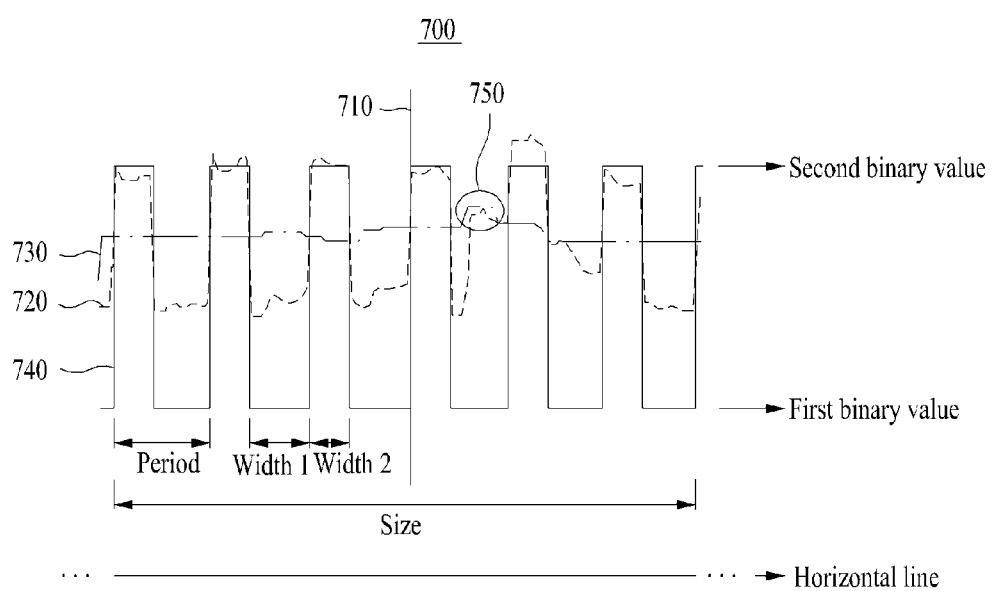

FIG. 7 is a view illustrating a pattern generated by applying the mini-max filter. In the graph of FIG. 7, a central line 710, a first line 720 representing a color value of each pixel on the horizontal line, a second line 730 representing the average value of the mini-max filter for each pixel on the horizontal line, and a third line 740 representing a binary color value of each pixel on the horizontal line are depicted. Each point on the third line 740 may have the first or second binary value. Each point on the first line 720 may correspond to a point having the same coordinates on the third line 740. The points on the first line 720 may represent the color values of the pixels on the horizontal line, respectively. The points on the third line 740 may represent the binary color value of the pixels on the horizontal line, respectively. The points on the second line 730 may represent the color values of the mini-max filter for the pixels on the horizontal line, respectively. The pixels of each of the first to third lines 720 to 740 may represent the pixels corresponding to the horizontal coordinates of the pixels, respectively. The height of a point in the graph may represent a color value of the corresponding pixel. As the mini-max filter is applied, each point on the first line 720, which is positioned higher than the corresponding point on the second line 730, becomes a point on the third line 740 having the second binary value through binarization. In addition, each point on the first line 720, which is positioned lower than the corresponding point on the second line 730, becomes a point on the third line 740 having the first binary value through binarization. An abnormal point 750 among the points on the first line 720, which corresponds to the abnormal point 550 described above with reference to FIG. 5, is shown in FIG. 7. Although the abnormal point 750 relatively has a high color value by applying the mini-max filter, the abnormal point 750 has a color value lower than the average. Thus, the point corresponding to the abnormal point 750 on the third line 740 has the first binary value. As the result, the third line 740 may have a waveform in which the first binary values having a constant width and the second binary values having a constant width are periodically repeated. The widths of the first binary values will be referred to as width 1, and the widths of the second binary values will be referred to as width 2. In addition, the recognition unit 111 may recognize the entire size of a waveform periodically repeated.

Therefore, the recognition unit 111 may detect a pattern representing a crosswalk in a binary horizontal line. In this case, the binary horizontal line may represent the binary pixels obtained by binarizing the pixels on the horizontal line, respectively. The binary horizontal line may be the third line 740 described above. The pattern may have a width of a specific first setting value or more and a shape of a rectangular waveform repeated a specific second setting value or more of times. In this case, the width may be at least one of width 1 and width 2. The repetition may represent it to repeat a period including continuous first binary values and continuous second binary values. The period repeated 6 times on the third line 740 is shown. For example, when a period including 10 pixels or more having the first binary value and 10 pixels or more having the second binary value is repeated 4 times, the recognition unit 111 may recognize the binary horizontal line as a crosswalk such that the recognition unit 111 detects the crosswalk. The horizontal line described above may include a plurality of horizontal lines in the detection region. The recognition unit 111 may generate a plurality of binary horizontal lines by binarizing a plurality of horizontal lines, and may detect a crosswalk in the image by using the binary horizontal lines. The crosswalk may be shown in a form of repeated rectangular black and white blocks in the plurality of binary horizontal lines. Thus, the pattern used to detect a crosswalk may be a two-dimensional plane pattern including the first and second binary values. The pattern may have a height of the third setting value or more and a width of the second setting value or more and a form of black and white rectangular waveforms repeated the fifth setting value of more of times.

Next, a technique of recognizing a pedestrian on a crosswalk will be described.

Figure 8:
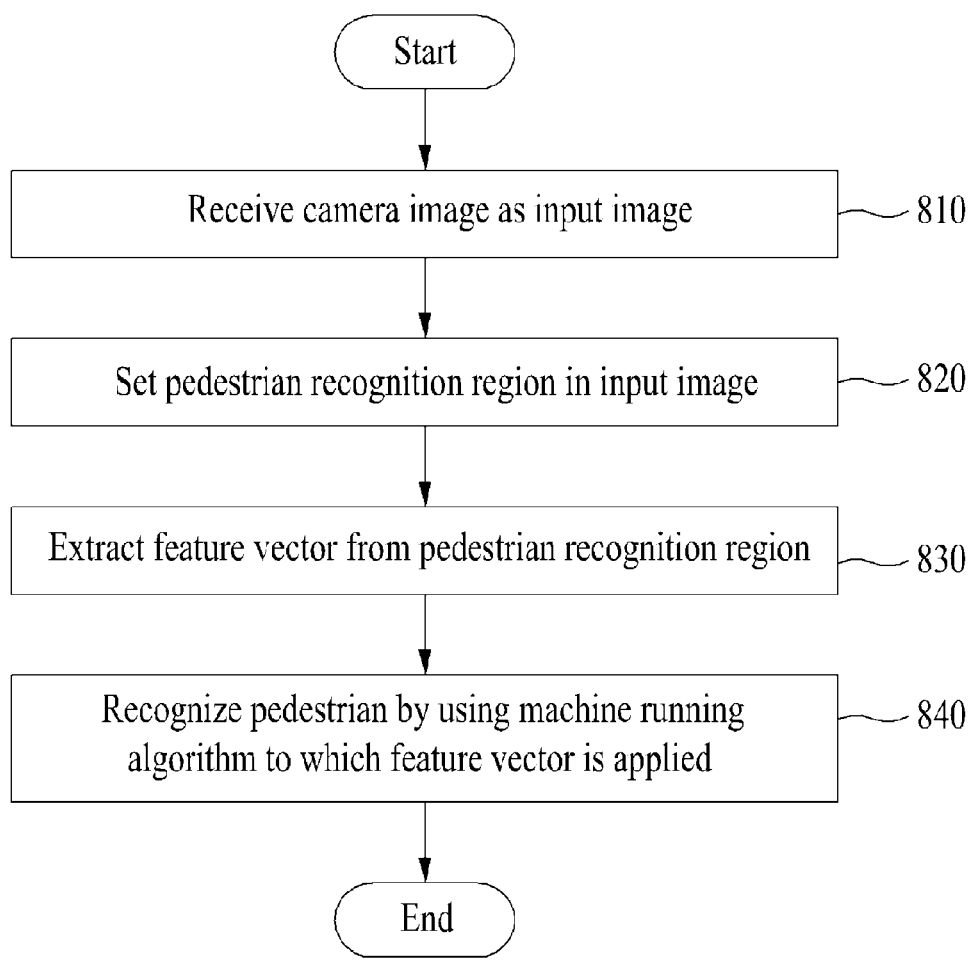
FIG. 8 is a view illustrating a method of recognizing a pedestrian according to an embodiment.

FIG. 8 is a flowchart illustrating a method of recognizing a pedestrian according to an embodiment. According to the method of recognizing a pedestrian of an embodiment, the following steps may be performed through the recognition unit 111 described above with reference to FIG. 1.

In step 810, the recognition unit 111 may receive a camera image as an input image for recognizing a pedestrian. The recognition unit 111 may initialize a variable for recognizing a pedestrian in the input image.

In step 820, the recognition unit 111 may set a pedestrian recognition region as the ROI for recognizing a pedestrian in the input image. In this case, the pedestrian recognition region may be set based on a pedestrian recognizable distance in which a pedestrian is recognizable. For example, the recognition unit 111 may create the pedestrian recognition region by projecting the maximum distance (for example, 30 m), in which a pedestrian is recognizable in a three-dimensional real space, on the image input from the camera by using an H-matrix. The H-matrix may include a 3×4 matrix having an intrinsic parameter and an extrinsic parameter. In this case, the intrinsic parameter may represent a parameter concerned with information about an inside of the camera or an error, and the extrinsic parameter may represent a parameter concerned with information about a distance from a starting point to the camera or a rotation thereof in a three-dimensional real coordinate system. For example, the intrinsic parameter may include a lens distortion, a focal length, an image center and the like, and the extrinsic parameter may include a moving distance and a rotation angle of the camera in a three-dimensional real coordinate system.

In step 830, the recognition unit 111 may extract a feature vector representing a pedestrian from the pedestrian recognition region. There are various schemes of determining whether an interest object in an image is a pedestrian. A typical image feature may include HOG (Histogram of Oriented Gradient), LBP (Local Binary Pattern), Haar-like, SIFT (Scale Invariant Feature Transform), MCT (Modified Census Transform), etc. For example, the HOG feature extraction scheme constructs the pedestrian recognition region with blocks and divides the block into a plurality of cells. Then, a HOG feature vector is generated through the histogram of gradients by computing gradients between pixels in each cell. The most dominant gradients among the HOG feature vectors are analyzed. Then, when the analyzed gradients have a shape of a human being, it may be determined that a pedestrian exists in the corresponding block.

In step 840, the recognition unit 111 may recognize a pedestrian within the pedestrian recognition region by using a machine running algorithm to which a feature vector is applied. For example, the recognition unit 111 may recognize a pedestrian by using an adaboost algorithm to which a feature vector is applied and an SVM (support vector machine) algorithm. As described above, a training data extraction process may be applied for a method of recognizing a pedestrian. The training data extraction process refers to a process of extracting information (difference in brightness with surroundings, distribution of boundary values, etc.) which may represent an object to be recognized, that is, a feature vector, from positive data of the object and training the feature vector. To detect a pedestrian, a block having a predetermined size is compared with a feature vector of a pedestrian block previously trained while being transferred on the whole image. When the feature vector of the previously trained pedestrian block is similar to the feature vector of a block in the image, it may be detected as a pedestrian. An adaboost training classification method, which is a recognition and classification algorithm widely used in the related art, is an algorithm widely used in a field of detecting an object having an appearance of a block type such as a pedestrian, a vehicle or a face.

The recognition unit 111 may track a pedestrian by applying a kalman filter to the pedestrian detected in the pedestrian recognition region. The kalman filter is an optimal estimation technique of searching for a state variable of a system by using a probabilistic model of a target system and a measurement value. There may be applied a method which processes windows as a single window by applying a clustering technique to the windows closed to each other to remove an overlap region after tracking an object of interest through a kalman filter.

Next, a technique of recognizing a forward vehicle will be described.

Figure 9:
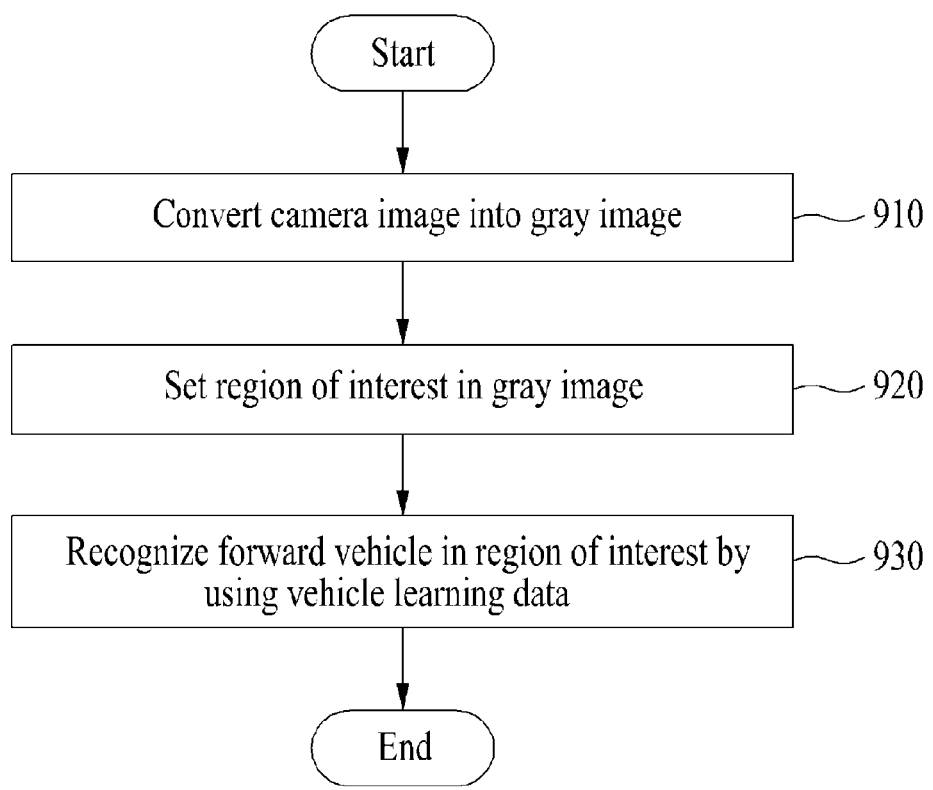
FIG. 9 is a view illustrating a method of recognizing a forward vehicle according to an embodiment.

FIG. 9 is a flowchart illustrating a method of recognizing a forward vehicle according to an embodiment. According to the method of recognizing a forward vehicle, the following steps may be performed through the recognition unit 111 described through FIG. 1.

In step 910, the recognition unit 111 converts the camera image input from the camera into a gray (black and white) image. Since the gray image conversion process is similar to that of the step 210 described with reference to FIGS. 2 and 3, the details will be omitted.

In step 920, the recognition unit 111 may set a ROI for recognizing a forward vehicle in the gray image. Since the ROI setting process is similar to that of the step 220 described with reference to FIGS. 2 and 4, the details will be omitted.

In step 930, the recognition unit 111 may recognize a forward vehicle in the ROI by using training data on a vehicle. To generate a training pattern for detecting a forward vehicle, an image well showing a back view of a vehicle among the images photographed by the camera may be collected as a positive image and an image irrelevant to a vehicle may be collected as a negative image. For example, the recognition unit 111 may be trained with training data classified into the positive and negative images by applying the adaboost algorithm, and after converting the trained learning result into an XML file, may use the XML file as a vehicle detection pattern for detecting a forward vehicle. After detecting at least one vehicle candidate region by applying the adaboost algorithm in the ROI, the recognition unit 111 may detect a forward vehicle through a process of verifying the vehicle candidate region.

For example, the recognition unit 111 may verify the vehicle candidate region based on the fact that an image of a vehicle is brightened when intensity accumulation values are accumulated over time. In other words, the recognition unit 111 may calculate an intensity accumulation value of each vehicle candidate region over time. When the intensity accumulation value exceeds a predetermined threshold value, the recognition unit 111 may determine the vehicle candidate region as a forward vehicle. To the contrary, if not, the recognition unit 111 may exclude it from the vehicle candidate region.

As another example, the recognition unit 111 may verify the vehicle candidate region by using a distance ratio between a forward vehicle and the vehicle in a space region of one image. By using a spatial ratio feature that the width of a forward vehicle from side to side is reduced as the distance between vehicles is increased and the width of a forward vehicle from side to side is widened as the distance between vehicles is reduced, an experimental value of the distance ratio in accordance with a vehicle position may be obtained. That is, after calculating the size ratios of vehicle candidate regions, respectively, when the size ratio of a vehicle candidate region corresponds to the experimental value of the distance ratio in accordance with a vehicle position, the recognition unit 111 may determine the region as a forward vehicle. If not, the recognition unit 111 may exclude the region from the vehicle candidate region.

As still another example, after detecting a line in the ROI, the recognition unit 111 may verify the vehicle candidate region by using a distance ratio between a forward vehicle and the vehicle based on the detected line. To this end, the recognition unit 111 may apply the Canny algorithm to the gray image corresponding to the ROI to detect edges such that the recognition unit 111 obtains an edge image. In addition, the recognition unit 111 may apply the Hough transformation algorithm to the edge image to detect edges representing a straight line such that the recognition unit 111 recognizes the position of the detected straight line as a line. In this case, after the recognition unit 111 selects a vehicle candidate region positioned on the line from the vehicle candidate regions, when a size ratio of the selected vehicle candidate region corresponds to the experimental value of the distance ratio in accordance with the vehicle position, the recognition unit 111 may recognize the selected vehicle candidate region as a forward vehicle.

As still another example, the recognition unit 111 may detect a forward vehicle by applying the vehicle detection frequencies of the previous images and the current image at the position detected as a vehicle candidate region. In other words, the recognition unit 111 may compare the vehicle candidate region with a previous image such that the recognition unit 111 determines whether a forward vehicle exists in accordance with the detection frequency of the vehicle candidate region as a forward vehicle.

The recognition unit 111 may apply the kalman filter to the detected forward vehicle to track the forward vehicle such that the recognition unit 111 recognizes whether the vehicle starts. In addition, the recognition unit 111 may apply a method which processes windows as a single window by applying a clustering technique to the windows closed to each other while removing an overlap region after tracking an object of interest through a kalman filter.

Last, a technique of recognizing the traffic signal of a traffic light will be described as follows.

The recognition unit 111 may recognize the traffic signal of a traffic light located forward of the vehicle. As one example, the recognition unit 111, which utilizes the techniques of recognizing a crosswalk, a line, a pedestrian, and a forward vehicle described above, may recognize a traffic light in an image and a lightening state of the traffic light by using the camera image. The lightening state of the traffic light may be classified into red and yellow signals for stopping a vehicle and a green signal for allowing a vehicle to start. As another example, the recognition unit 111 may recognize the traffic signal through a method of recognizing a wavelength of light. For example, the recognition unit 111 may sense a red wavelength signal and a blue wavelength signal of the traffic light through a sensor for sensing an intrinsic wavelength in a visible wavelength range. After converting the sensed wavelength signal of the traffic light into a typical digital value, the recognition unit 111 may compare the digital value with a predetermined wavelength region setting value to determine the lightening state of the traffic light. When the sensed wavelength signal is in the wavelength region of 65 to 70, the recognition unit 111 may determine the traffic signal of the traffic light as a red signal. Differently, when the sensed wavelength signal is in the wavelength region of 45 to 55, the recognition unit 111 may determine the traffic signal of the traffic light as a green signal.

Detained embodiments of methods of (1) recognizing a crosswalk, (2) recognizing pedestrians on a crosswalk, (3) recognizing a forward vehicle, and (4) recognizing a traffic signal of a traffic light have been described, but the embodiments are not limited to them and various algorithms used for recognizing or tracking an object of interest in an image may be applied to them.

FIG. 1 illustrates the recognition unit 111 installed in the apparatus 100 for providing guidance information, but the embodiment is not limited thereto. It is also possible to obtain a recognition result necessary for providing guidance information from an image analysis apparatus separately configured and utilize it.

According to an embodiment, to provide guidance information in accordance with a situation around a vehicle, all or a part of the results of recognizing a crosswalk, a pedestrian, a forward vehicle and a traffic light may be utilized. In this case, a part of the recognition results may basically include the result of recognizing a crosswalk.

Figure 10:
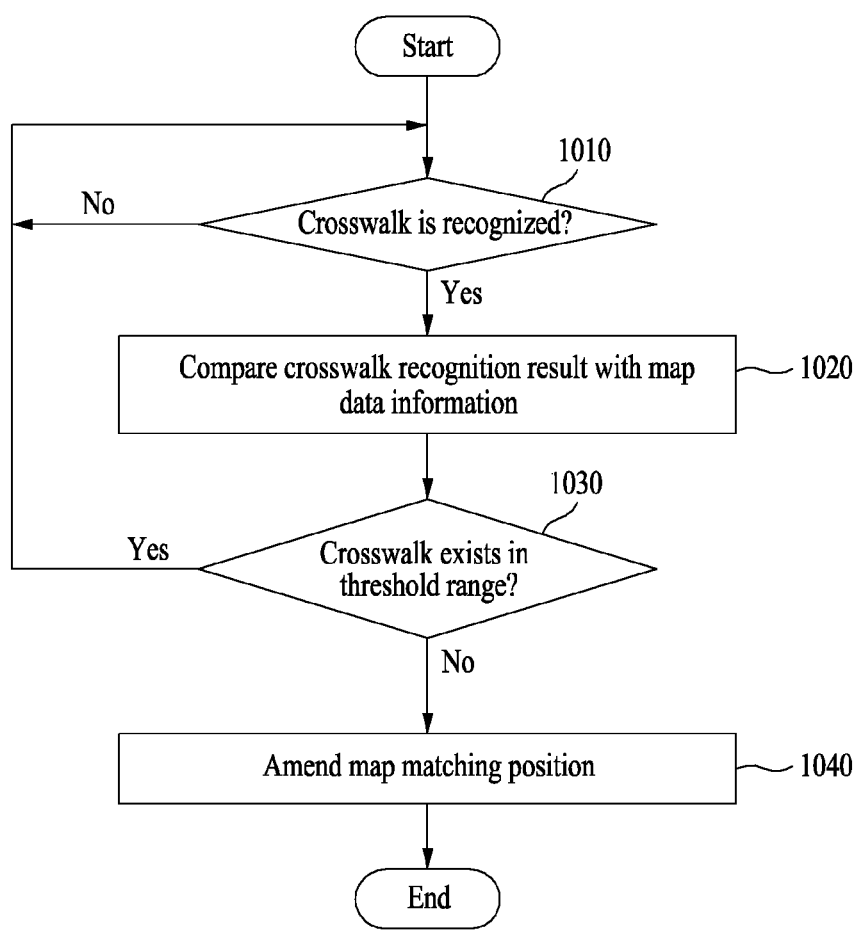
FIGS. 10 to 14 are views illustrating a method of providing guidance information using a crosswalk recognition result according to an embodiment.

FIG. 10 is a flowchart illustrating a map matching method using a crosswalk recognition result according to an embodiment. According to the map matching method of an embodiment, the following steps may be performed through the providing unit 112 described above with reference to FIG. 1.

According to an embodiment, guidance information about a GPS position may be provided by using the crosswalk recognition result.

In step 1010, the providing unit 112 may confirm whether a crosswalk exists forward of the present vehicle based on the crosswalk recognition result.

In step 1020, when a crosswalk exists forward of the present vehicle, the providing unit 112 may compare the corresponding recognition result with information about real map data of a navigation system. For example, the providing unit 112 may determine whether a crosswalk exists within a threshold range (for example, 30 m) based on the map data about a current position recognized by the navigation system.

In step 1030, the providing unit 112 may determine whether to perform a map matching amendment based on the result of comparing the crosswalk recognition result with the map data. In other words, although the providing unit 112 recognizes a crosswalk from a camera image, if any crosswalks do not exist in the threshold range of data on the map matched in accordance with a current position of the present vehicle, the providing unit 112 may determine that a map matching amendment is required at the current time point.

In step 1040, the providing unit 112 may amend a map matching position with respect to the current position of the present vehicle by using the crosswalk recognition result. When the position, at which a GPS signal concerning a position of the present vehicle is received, is out of the error range based on the crosswalk recognition result, a map matching with respect to the GPS reception position may be performed again. For example, although the providing unit 112 recognizes the crosswalk based on the camera image, when the crosswalk does not exist in the threshold range on the map data, the providing unit 112 may amend the information about the GPS position of the present vehicle to the closest position to the direction vector of GPS.

A conventional navigation system has guided a current position of the present vehicle on a map by using GPS. However, when the vehicle is positioned in a shadow zone such as a tall building area or a tunnel, or a GPS distance error occurs due to its GPS performance, the navigation system cannot provide exact location guidance. Although the GPS distance error approximates about 30 m, the embodiment may amend the information about GPS position guidance by comparing the crosswalk recognition result with information about map data of the navigation system.

Figure 11:
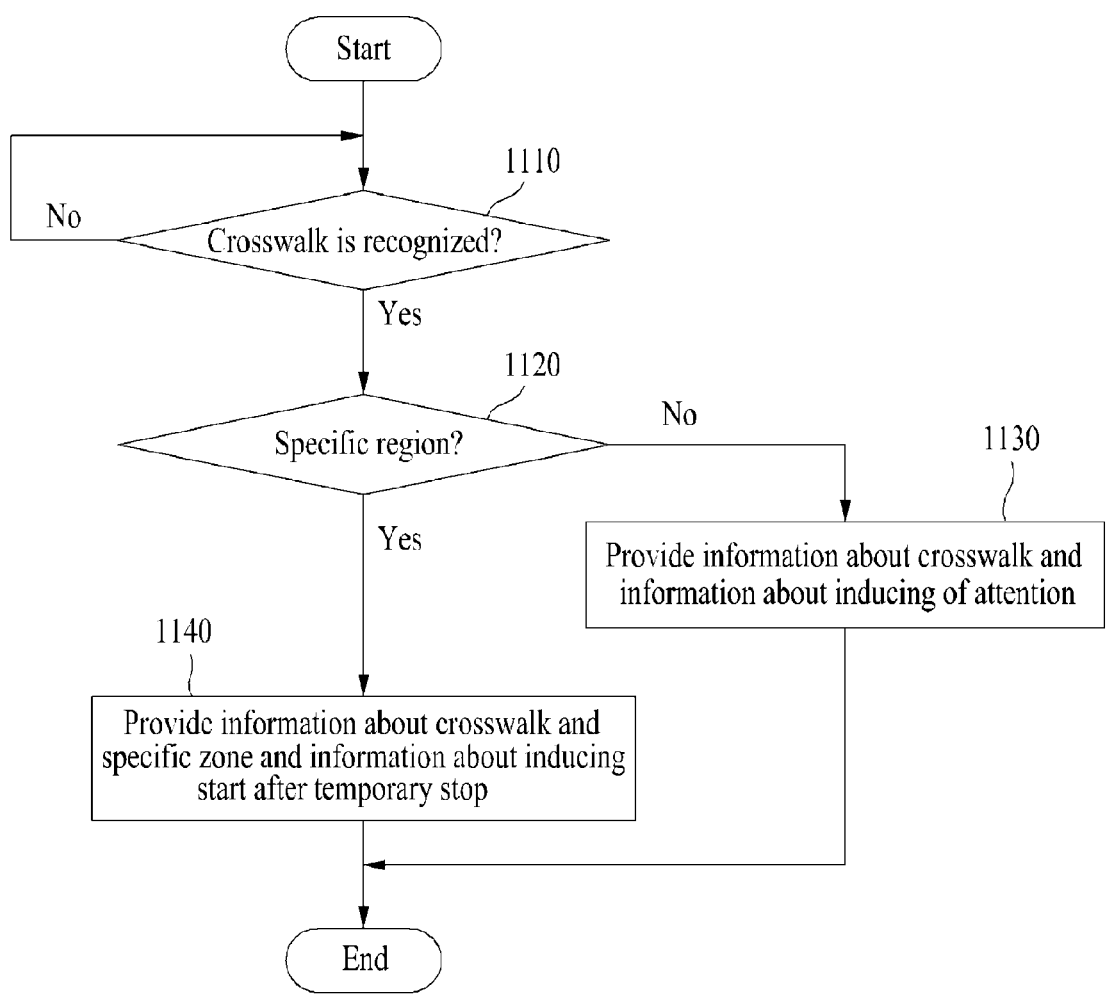

FIG. 11 is a flowchart illustrating a method of providing guidance information about a crosswalk according to an embodiment. According to the guidance information providing method of an embodiment, the following steps may be performed through the providing unit 112 described with reference to FIG. 1.

According to an embodiment, the guidance information may be provided to induce the safe driving of the vehicle by using the crosswalk recognition result.

In step 1110, the providing unit 112 may confirm whether a crosswalk exists forward of the present vehicle based on the crosswalk recognition result.

In step 1120, when a crosswalk exists forward of the present vehicle, the providing unit 112 may confirm whether the present vehicle is located in a preset specific zone or on a crosswalk adjacent to the preset specific zone based on the current position thereof by using GPS-based location information. For example, the specific zone may include a children protection zone, a bus-only lane zone and the like.

In step 1130, when the forward crosswalk is irrelevant to the preset specific zone, the providing unit 112 may provide information about the fact that a crosswalk existing forward of the vehicle is recognized and information to induce attention to the crosswalk as general guidance information concerning a crosswalk.

In step 1140, when the forward crosswalk exists in a specific zone or is a crosswalk adjacent to the specific zone, the providing unit 112 may provide information about the fact that the specific zone is recognized as well as the crosswalk as forceful guidance information distinguished from the general guidance information. Specifically, the providing unit 112 may provide information to induce the vehicle to stop temporarily and start again (for example, announcing that 'This is a school zone. Please stop in front of a crosswalk for three seconds and start again after confirming a surround.').

In recent years, to reduce accidents on a crosswalk in a specific zone (such as a school zone), various methods such as a safety guidance lamp, a bump, or a zigzag line have been applied. However, such methods require a driver to analyze and recognize the visual information by himself. Thus, the embodiments may combine location information of a navigation for assisting the decision of a driver and crosswalk recognition information obtained by analyzing a camera image to provide a notice of requesting a vehicle to stop and start again on a crosswalk in a specific zone, thereby inducing safety driving.

In addition, to provide information about the fact that the a forward crosswalk is recognized, the providing unit 112 may output voice guidance of informing of the existence of a forward crosswalk and display the information about the crosswalk on the display of a navigation system in a visual form such as flickering or emphasis. Thus, to call driver's attention to a crosswalk for the purpose of safe driving on the crosswalk in the daytime and at night, the crosswalk may be directly displayed on a navigation system and guidance about attention may be provided. Therefore, a driver may easily recognize a crosswalk during driving at night such that an accident may be prevented from occurring on a crosswalk due to carelessness.

Figure 12:
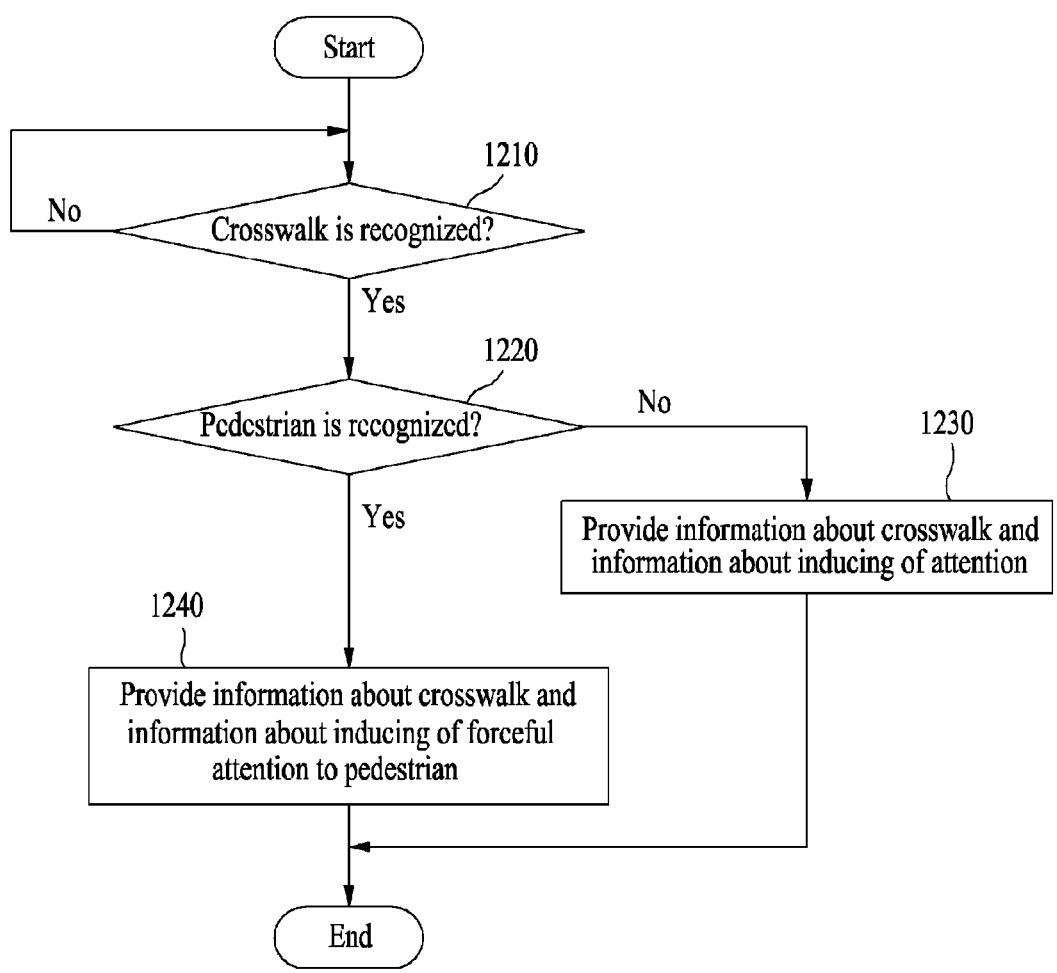

FIG. 12 is a flowchart illustrating a method of providing guidance information about a crosswalk according to another embodiment. According to the guidance information providing method of another embodiment, the following steps may be performed through the providing unit 112 described with reference to FIG. 1.

According to an embodiment, the guidance information may be provided to induce the safe driving of the vehicle by using the crosswalk recognition result and the pedestrian recognition result.

In step 1210, the providing unit 112 may confirm whether a crosswalk exists forward of the present vehicle based on the crosswalk recognition result.

In step 1220, when a crosswalk exists forward of the present vehicle, the providing unit 112 may confirm whether a pedestrian exists on the crosswalk based on the pedestrian recognition result.

In step 1230, when any pedestrians do not exist on the forward crosswalk, the providing unit 112 may provide information about the fact that a crosswalk existing forward of the vehicle is recognized and information to induce attention to the crosswalk as general guidance information concerning a crosswalk.

In step 1240, when a pedestrian exists on the forward crosswalk, the providing unit 112 may provide information about the facts that a crosswalk existing forward of the vehicle is recognized and a pedestrian exists on the forward crosswalk as more forceful guidance information. Specifically, the providing unit 112 may output information distinguished from the general guidance information as the information to induce forceful attention. In this case, when a pedestrian on a crosswalk is recognized, the providing unit 112 may provide a forceful alarm and display the existence of a pedestrian on the display of a navigation system in a visual form such as flickering or emphasis as guidance information concerning a pedestrian.

In addition, according to an embodiment, in step 1240, when a pedestrian is detected on a crosswalk, the providing unit 112 may transmit a signal to an ECU (Electronic Control Unit: not shown) capable of controlling the acceleration/deceleration and braking of a vehicle such that the vehicle is braked or decelerated.

In advance, the providing unit 112 may provide guidance information about all pedestrians recognized forward of the vehicle as well as the pedestrian recognized on the crosswalk. In this case, the providing unit 112 may divide the guidance information into guidance information about a pedestrian on another road (such as a sidewalk) and guidance information about a pedestrian on a crosswalk. For example, the providing unit 112 may provide more forceful guidance information about a pedestrian on a crosswalk than guidance information about a pedestrian on a sidewalk.

Figure 13:
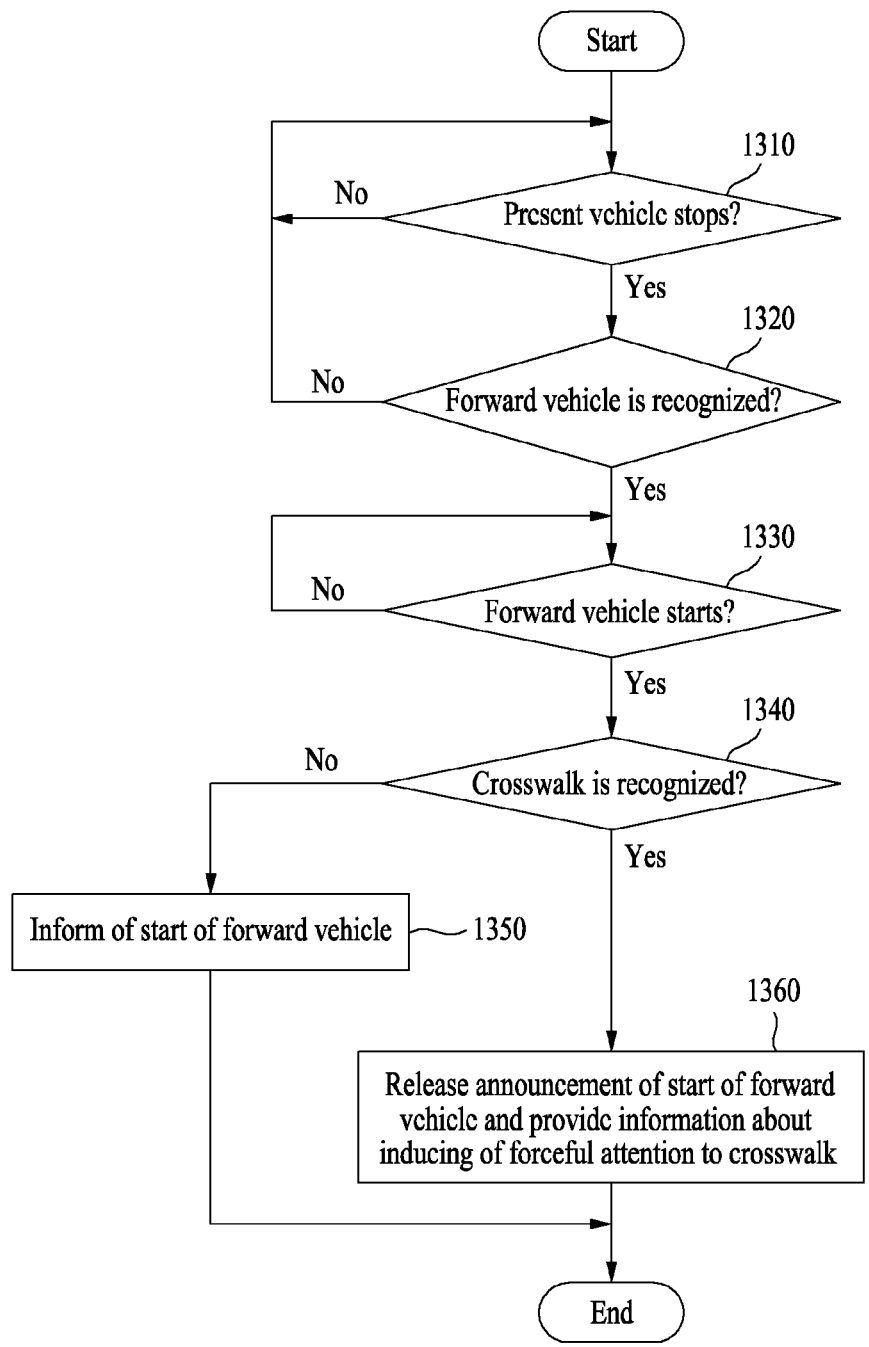

FIG. 13 is a flowchart illustrating a method of providing guidance information about a crosswalk according to still another embodiment. According to the guidance information providing method of still another embodiment, the following steps may be performed through the providing unit 112 described with reference to FIG. 1.

According to an embodiment, the guidance information may be provided to induce the safe driving of the vehicle by using the crosswalk recognition result and the forward vehicle recognition result.

In step 1310, the providing unit 112 may confirm whether the present vehicle stops based on the current vehicle location and the sensing value.

In step 1320, when the present vehicle stops, the providing unit 112 may confirm whether a forward vehicle exists forward of the present vehicle based on the forward vehicle recognition result.

In step 1330, the providing unit 112 may confirm whether the forward vehicle starts based on the forward vehicle tracking result included in the forward vehicle recognition result.

In step 1340, when the start of the forward vehicle is recognized, the providing unit 112 may confirm whether a crosswalk exists forward of the present vehicle based on the crosswalk recognition result.

In step 1350, when any crosswalks do not exist forward of the present vehicle, the providing unit 112 may provide information about the start of the forward vehicle through an announcement of the start of the forward vehicle as general guidance information concerning the start of the forward vehicle.

In step 1360, when a crosswalk exists forward of the present vehicle, the providing unit 112 may release the announcement of the start of the forward vehicle or provide information about the fact that the forward crosswalk is recognized as more forceful guidance information. For example, when any crosswalks do not exist forward of the present vehicle, even though the forward vehicle starts, the providing unit 112 does not perform the announcement of the start of the forward vehicle through the release of the announcement. As another example, the providing unit 112 may output information distinguished from the general guidance information as the information to induce forceful attention to the crosswalk. In this case, even though the forward vehicle starts, when the forward crosswalk is recognized, the providing unit 112 may provide a forceful alarm and display the existence of the crosswalk on the display of a navigation system in a visual form such as flickering or emphasis as guidance information concerning the crosswalk recognition.

Therefore, according to the embodiment, when guidance information about the start of the forward vehicle under the condition in which the present stops is provided, mutually different guidance information may be provided in accordance with whether a crosswalk exists or not. This is to guarantee the safety of a pedestrian on the crosswalk between the present vehicle and a forward vehicle.

Figure 14:
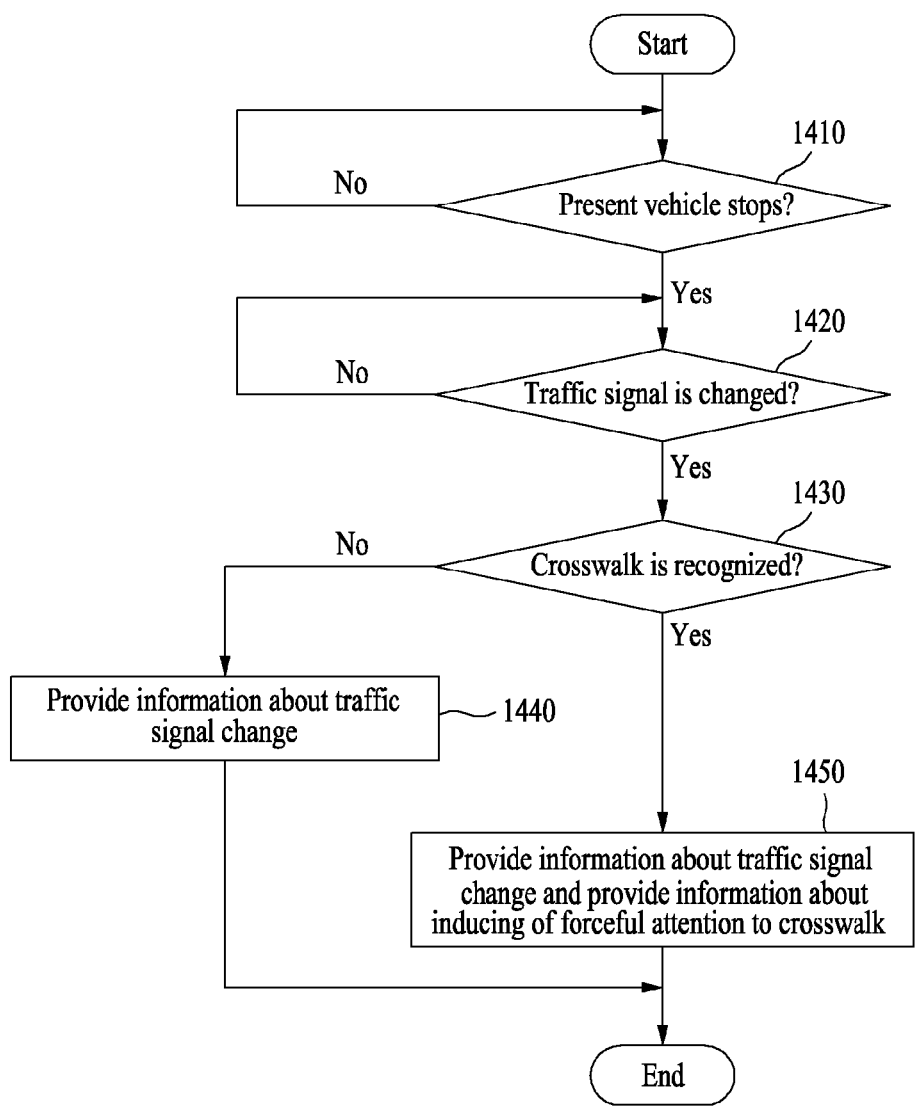

FIG. 14 is a flowchart illustrating a method of providing guidance information about a crosswalk according to still another embodiment. According to the guidance information providing method of still another embodiment, the following steps may be performed through the providing unit 112 described with reference to FIG. 1.

According to an embodiment, the guidance information may be provided to induce the safe driving of the vehicle by using the crosswalk recognition result and the traffic light recognition result.

In step 1410, the providing unit 112 may confirm whether the present vehicle stops based on the current vehicle location and the sensing value.

In step 1420, when the present vehicle stops, the providing unit 112 may confirm whether the traffic signal of the traffic light is changed based on the traffic light recognition result.

In step 1430, when the change of the traffic signal of the traffic light is recognized, the providing unit 112 may confirm whether a crosswalk exists forward of the present vehicle based on the crosswalk recognition result.

In step 1440, when any crosswalks do not exist forward of the present vehicle, the providing unit 112 may provide information about the change of the traffic signal through an announcement of the traffic signal change of the traffic light as general guidance information concerning the traffic signal change of the traffic light.

In step 1450, when a crosswalk exists forward of the present vehicle, the providing unit 112 may provide information about the forward crosswalk recognition as more forceful guidance information. Specifically, the providing unit 112 may output information distinguished from the general guidance information as the information to call forceful attention to a crosswalk. In this case, even though the traffic signal change of the traffic light is recognized, when a forward crosswalk is recognized, the providing unit 112 may provide a forceful alarm and display the existence of a crosswalk on the display of a navigation system in a visual form such as flickering or emphasis as guidance information concerning a crosswalk.

In advance, after the present vehicle stops in front of a crosswalk, when the present vehicle starts before the traffic signal of the traffic light is changed, the providing unit 112 may provide guidance information about warning of carelessness based on the crosswalk recognition result and the traffic light recognition result.

Therefore, according to the embodiment, when guidance information about the traffic signal change of the traffic light under the condition in which the present stops is provided, mutually different guidance information may be provided in accordance with whether a crosswalk exists or not. Thus, a forceful announcement of calling attention to the safe driving around a crosswalk may be provided to a driver who first responds to the traffic signal of the traffic light.

The guidance information based on various types of recognition results including crosswalk recognition may be provided in forms of an acoustical output such as voice mention or buzzer sound and a visual output on a navigation system. In addition, the guidance information may be divisively provided in a form of combining at least one output element or in such a manner of changing output elements under surrounding conditions.

Methods according to an embodiment of the inventive concept may be implemented in the form of program instruction executable through various computer systems and may be recorded on a computer-readable recording medium. In particular, a program according to an embodiment of the inventive concept may be a PC-based program or an application dedicated to a mobile terminal.

As described above, according to the embodiments, after a forward crosswalk is recognized, the crosswalk recognition result may be audiovisually output to arouse recognition and attention to the crosswalk, such that a driver is induced to safely drive a vehicle. In addition, according to the embodiments, the map matching position of a vehicle may be amended by comparing the crosswalk recognition result with the map data so that the map matching error of a navigation system is minimized, thereby improving the user reliability of position guidance. In addition, according to the embodiments, the guidance information may be distinguished and provided based on the result of recognizing a pedestrian on a crosswalk, a forward vehicle or a signaling state of a traffic light, such that a driver is informed in exact detail of the surrounding situation to call driver's attention, thereby guaranteeing safe driving of the driver and safety of pedestrians on a crosswalk.

The methods according to embodiments may be implemented in the form of program instruction executable through various computer systems and may be recorded on a computer-readable recording medium.

The units (or devices) described herein may be implemented using hardware components, software components, and/or a combination thereof. For example, devices and components described therein may be implemented using one or more general-purpose or special purpose computers, such as, but not limited to, a processor, a controller, an arithmetic logic unit (ALU), a digital signal processor, a microcomputer, a field programmable gate array (FPGA), a programmable logic unit, a microprocessor or any other device capable of responding to and executing instructions in a defined manner. A processing device may run an operating system (OS) and one or more software applications that run on the OS. The processing device also may access, store, manipulate, process, and create data in response to execution of the software. For the sake of easy understanding, an embodiment of the inventive concept is exemplified as one processing device is used; however, one skilled in the art will appreciate that a processing device may include multiple processing elements and multiple types of processing elements. For example, a processing device may include multiple processors or a processor and a controller. In addition, other processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to embodiments may be implemented in the form of program instruction executable through various computing devices and may be recorded in a computer-readable medium. The computer-readable medium may also include program instructions, data files, data structures, and the like independently or in the form of combination. The program instructions recorded in the medium may be those specially designed and constructed for the embodiment or may be well-known and available to those skilled in the computer software arts. Examples of the computer-readable medium may include magnetic media such as hard disks, floppy disks, and magnetic tape; optical media such as CD ROM disks and DVD; magneto-optical media such as floptical disks; and hardware devices that are specialized to store and perform program instructions, such as read-only memory (ROM), random access memory (RAM), flash memory, and the like. Examples of program instructions may include both machine code produced by a compiler and high-level code executed by the computer using an interpreter. The described hardware devices may be configured to operate as one or more software modules to perform the operations of the above-described embodiments, and vice versa.

Although being described with reference to specific examples and drawings, modifications, additions and substitutions on embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to the embodiments, after a forward crosswalk is recognized, the crosswalk recognition result may be audio visually output to arouse recognition and attention to the crosswalk, such that a driver is induced to safely drive a vehicle.

According to the embodiments, the map matching position of a vehicle may be amended by comparing the crosswalk recognition result with the map data so that the map matching error of a navigation system is minimized, thereby improving the user reliability of position guidance.

According to the embodiments, the guidance information may be distinguished and provided based on the result of recognizing a pedestrian on a crosswalk, a forward vehicle or a signaling state of a traffic light, such that a driver is informed in exact detail of the surrounding situation to call driver's attention, thereby guaranteeing safe driving of the driver and safety of pedestrians on a crosswalk.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method of providing guidance information, the method being implemented by a computer, the method comprising:
confirming a result of recognizing a crosswalk around a vehicle;
comparing the crosswalk recognition result with map data on a global positioning system (GPS) reception position of the vehicle;
amending a map matching position of the GPS reception position based on the comparison result; and
providing a position information of the vehicle as guidance information based on the amended map matching position,
wherein comparing of the crosswalk recognition result with the map data comprises confirming whether a real crosswalk exists within a threshold range, based on the map data on the GPS reception position, and
wherein amending the map matching position comprises amending the map matching position when the crosswalk recognition result does not correspond to whether the real crosswalk exists.

2. A method of providing guidance information, the method being implemented by a computer, the method comprising:
confirming a result of recognizing a crosswalk around a vehicle;
confirming a result of recognizing a surrounding situation concerned with forward traveling of the vehicle;
distinguishing guidance information for the crosswalk recognition result based on the surrounding situation recognition result to provide the guidance information; and
recognizing a crosswalk in an image by analyzing the image obtained by photographing a surrounding of the vehicle,
wherein recognizing of the crosswalk in the image is performed by detecting a pattern corresponding to the crosswalk in a binary image which is generated by applying a mini-max filter to a horizontal line of the image to binarize the image.

3. The method of claim 2, wherein the confirming of the surrounding situation recognition result comprises determining whether the vehicle is located within a preset specific zone, based on a global positioning system (GPS) reception position of the vehicle, and
the guidance information is differently provided in accordance with whether the vehicle is located within the preset specific zone.

4. The method of claim 2, wherein the confirming of the surrounding situation recognition result comprises confirming a result of recognizing a pedestrian on the crosswalk, and the guidance information is differently provided in accordance with the pedestrian recognition result.

5. A method of providing guidance information, the method being implemented by a computer, the method comprising:
confirming a result of recognizing a crosswalk around a vehicle;
confirming a result of recognizing a surrounding situation concerned with forward traveling of the vehicle;
distinguishing guidance information for the surrounding situation recognition result based on the crosswalk recognition result to provide the guidance information; and
recognizing a crosswalk in an image by analyzing the image obtained by photographing a surrounding of the vehicle,
wherein recognizing of the crosswalk in the image is performed by detecting a pattern corresponding to the crosswalk in a binary image which is generated by applying a mini-max filter to a horizontal line of the image to binarize the image.

6. The method of claim 5, wherein the confirming of the surrounding situation recognition result comprises confirming a result of recognizing a forward vehicle located forward of the vehicle, and
the guidance information about the forward vehicle recognition result is differently provided in accordance with the crosswalk recognition result.

7. The method of claim 5, wherein the confirming of the surrounding situation recognition result comprises confirming a result of recognizing a traffic light located forward of the vehicle, and
the guidance information about the traffic light recognition result is differently provided in accordance with the crosswalk recognition result.

8. The method of claim 1, further comprising recognizing a crosswalk in an image by analyzing the image obtained by photographing a surround of the vehicle,
wherein the recognizing of the crosswalk in the image is performed by detecting a pattern corresponding to the crosswalk in a binary image which is generated by applying a mini-max filter to a horizontal line of the image to binarize the image.

9. The method of claim 4, further comprising recognizing a pedestrian in an image by analyzing the image obtained by photographing a surround of the vehicle,
wherein, after the image is divided into a plurality of blocks, the pedestrian is recognized in the image by comparing a feature vector of each block with a feature vector obtained by previously training a pedestrian.

10. The method of claim 6, further comprising recognizing the forward vehicle in an image by analyzing the image obtained by photographing a surround of the vehicle,
wherein, after at least one vehicle candidate region is detected in the image by using training data on the vehicle, the forward vehicle is detected in the at least one vehicle candidate region by using intensity accumulation value of the vehicle candidate region over time.

11. An apparatus of providing guidance information, the apparatus comprising:
a memory in which at least one program is loaded; and
at least one processor,
wherein, in accordance with the program, the at least one processor performs:
confirming a result of recognizing a crosswalk around a vehicle;

comparing the crosswalk recognition result with map data on a global positioning system (GPS) reception position of the vehicle;

amending a map matching position of the GPS reception position based on the comparison result; and providing a position information of the vehicle as guidance information based on the amended map matching position, wherein comparing the crosswalk recognition result with the map data comprises confirming whether a real crosswalk exists within a threshold range based on the map data on the GPS reception position, and wherein amending the map matching position comprises amending the map matching position when the crosswalk recognition result does not correspond to whether the real crosswalk exists.

12. An apparatus of providing guidance information, the apparatus comprising:

a memory in which at least one program is loaded; and at least one processor, wherein, in accordance with the program, the at least one processor performs:

confirming a result of recognizing a crosswalk around a vehicle;

confirming a result of recognizing a surrounding situation concerned with forward traveling of the vehicle;

distinguishing guidance information for the crosswalk recognition result based on the surrounding situation recognition result to provide the guidance information; and recognizing a crosswalk in an image by analyzing the image obtained by photographing a surrounding of the vehicle, wherein recognizing the crosswalk in the image comprises detecting a pattern corresponding to the crosswalk in a binary image which is generated by applying a mini-max filter to a horizontal line of the image to binarize the image.

13. The apparatus of claim 12, wherein the confirming of the surrounding situation recognition result comprises determining whether the vehicle is located within a preset specific zone based on a GPS reception position of the vehicle, and the guidance information is differently provided in accordance with whether the vehicle is located within the preset specific zone.

14. The apparatus of claim 12, wherein the confirming of the surrounding situation recognition result comprises confirming a result of recognizing a pedestrian on the crosswalk, and the guidance information is differently provided in accordance with the pedestrian recognition result.

15. An apparatus of providing guidance information, the apparatus comprising:

a memory in which at least one program is loaded; and at least one processor, wherein, in accordance with the program, the at least one processor performs:

confirming a result of recognizing a crosswalk around a vehicle;

confirming a result of recognizing a surrounding situation concerned with forward traveling of the vehicle;

distinguishing guidance information for the surrounding situation recognition result based on the crosswalk recognition result to provide the guidance information; and recognizing a crosswalk in an image by analyzing the image obtained by photographing a surround of the vehicle, wherein recognizing the crosswalk in the image comprises detecting a pattern corresponding to the crosswalk in a binary image which is generated by applying a mini-max filter to a horizontal line of the image to binarize the image.

16. The apparatus of claim 15, wherein the confirming of the surrounding situation recognition result comprises confirming a result of recognizing a forward vehicle located forward of the vehicle, and the guidance information about the forward vehicle recognition result is differently provided in accordance with the crosswalk recognition result.

17. The apparatus of claim 15, wherein the confirming of the surrounding situation recognition result comprises confirming a result of recognizing a traffic light located forward of the vehicle, and the guidance information about the traffic light recognition result is differently provided in accordance with the crosswalk recognition result.

18. The apparatus of claim 11, wherein, in accordance with the program, the at least one processor performs recognizing a crosswalk in an image by analyzing the image obtained by photographing a surround of the vehicle, wherein the recognizing of the crosswalk in the image is performed by detecting a pattern corresponding to the crosswalk in a binary image which is generated by applying a mini-max filter to a horizontal line of the image to binarize the image.

\* \* \* \* \*